United States Patent
Stewart

(12) 
(10) Patent No.: US 11,376,997 B2
(45) Date of Patent: Jul. 5, 2022

(54) DEVICES AND METHODS FOR SECURING A CHILD SAFETY SEAT WITHIN A VEHICLE

(71) Applicant: Aubreynette Stewart, Houston, TX (US)

(72) Inventor: Aubreynette Stewart, Houston, TX (US)

( * ) Notice: Subject to any disclaimer, the term of this patent is extended or adjusted under 35 U.S.C. 154(b) by 0 days.

(21) Appl. No.: 17/013,345

(22) Filed: Oct. 9, 2020

(65) Prior Publication Data

US 2022/0111774 A1    Apr. 14, 2022

(51) Int. Cl.
  *B60N 2/28*    (2006.01)

(52) U.S. Cl.
  CPC ........... *B60N 2/2806* (2013.01); *B60N 2/286* (2013.01); *B60N 2/2803* (2013.01); *B60N 2/2809* (2013.01)

(58) Field of Classification Search
  CPC .. B60N 2/2803; B60N 2/2806; B60N 2/2809; B60N 2002/2818
  See application file for complete search history.

(56) References Cited

U.S. PATENT DOCUMENTS

| | | | | |
|---|---|---|---|---|
| 5,197,176 A | * | 3/1993 | Reese | B25B 33/00 29/270 |
| 5,496,083 A | * | 3/1996 | Shouse, Jr. | B25B 9/00 29/278 |
| 5,620,231 A | * | 4/1997 | Marker | B60N 2/265 29/278 |
| 5,954,397 A | * | 9/1999 | Czernakowski | B60N 2/286 297/250.1 |
| 6,430,797 B1 | * | 8/2002 | Dittmar | B25B 9/00 29/270 |
| 6,837,807 B1 | * | 1/2005 | Kerr | A63B 57/50 473/286 |
| 6,969,122 B2 | * | 11/2005 | Sachs | B60R 22/30 280/801.1 |
| 9,085,447 B1 | * | 7/2015 | Royall | B25J 1/04 |
| 9,265,976 B1 | * | 2/2016 | Hensley | A62B 3/00 |
| 9,731,951 B1 | * | 8/2017 | Tolbert | B60N 2/2806 |
| 2002/0092135 A1 | * | 7/2002 | Mancini | B60N 2/2806 24/33 R |
| 2008/0290717 A1 | * | 11/2008 | Klapp | B60R 22/03 297/468 |
| 2009/0066144 A1 | * | 3/2009 | Fillie | B60R 22/024 297/463.1 |

\* cited by examiner

Primary Examiner — Syed A Islam

(57) ABSTRACT

An extendable safety belt guide with an outer body, an inner body, and a securing mechanism. Methods of guiding a safety belt through a child safety seat with the use of a safety belt guide that attaches to a safety belt and feeds the safety belt through a portion of a child safety seat.

7 Claims, 2 Drawing Sheets

DEVICES AND METHODS FOR SECURING A CHILD SAFETY SEAT WITHIN A VEHICLE

FIELD

In general, the disclosure describes an extendable safety belt guide. More specifically, an extendable safety belt guide to aid in securing a child safety seat within a vehicle.

BACKGROUND

Accidents and collisions are a part of driving. Safety belts are a required feature in virtually all motor vehicles. They play an important role in protecting passengers during an accident, collision, or other complication during operation or use of a vehicle. Namely, safety belts secure and protect drivers and passengers from collision energy that may cause injury or even death.

A child safety seat is a seat designed specifically to protect children from injury or death during vehicle collisions. Many jurisdictions require children to use a child safety seat when riding in a vehicle depending on the child's age, weight, and height. A child safety seat is often installed within a vehicle using a standard safety belt to secure the child safety seat in place. To be effective, it's crucial a child safety seat is installed correctly. However, many child safety seats are not installed properly, leading to unnecessary injury or harm to a child or infant during an accident or collision.

One reason for incorrect installation of the child safety seat is that the safety belt is incorrectly attached to the child safety seat. It is sometimes necessary to feed a portion of a safety belt through the child safety seat to properly secure the child safety seat within the vehicle. This can be difficult and frustrating for users as the correct portion of the child safety seat is a long, enclosed tunnel that is difficult to access, and the user may need to attempt to feed the safety belt through multiple times before being able to secure the safety belt and child safety seat. Pulling too much of the webbing from the safety belt out of the retractor may also lead to the retractor mechanism sticking, forcing a user to begin the process all over again. This difficult and time-consuming installation process can lead to users taking unsafe shortcuts such as feeding the safety belt through an incorrect portion of the child safety seat.

Therefore, a need exists for a safety belt guide that can more easily allow a user to secure a child safety seat within a vehicle to ensure the safety of children or infants during accidents or collisions.

SUMMARY

This summary is provided to introduce a selection of concepts that are further described below in the detailed description. However, many modifications are possible without materially departing from the teachings of this disclosure. Accordingly, such modification are intended to be included within the scope of this disclosure as defined in the claims. This summary is not intended to identify key or essential features of the claimed subject matter, nor is it intended to be used as an aid in limiting the scope of the claimed subject matter.

Devices and methods to guide a safety belt are described herein. Embodiments may include an outer body; an inner body housed within the outer body, wherein the inner body and the outer body are slideably engaged; and a securing mechanism disposed along an end of the safety belt guide.

One or more embodiments include the device of the preceding paragraph wherein the inner body may extend outward from the outer body.

One or more embodiments may include the device of any preceding paragraph with a release mechanism, the release mechanism capable of releasing the inner body from the outer body when activated.

One or more embodiments may include the device of any preceding paragraph wherein the securing mechanism is a hook.

One or more embodiments may include the device of any preceding paragraph wherein the securing mechanism is disposed along the inner body and is capable of being housed within the outer body when the safety belt guide is retracted.

Methods to guide a safety belt through a child safety seat are described herein. Embodiments may include extending an inner body from an outer body of a safety belt guide by activating a release mechanism on the safety belt guide; threading the extended safety belt guide through a portion of the child safety seat; connecting the safety belt guide with a safety belt; guiding the safety belt through the portion of the child safety seat; and securing the safety belt to a buckle.

One or more embodiments may include the method of any preceding paragraph, wherein the safety belt guide connects to the tongue of the safety belt.

BRIEF DESCRIPTION OF DRAWINGS

Certain embodiments of the disclosure will hereafter be described with reference to the accompanying drawings, wherein like reference numerals denote like elements. It is emphasized that, in accordance with standard practices in the industry, various features are not drawn to scale. In fact, the dimensions of various features may be arbitrarily increased or reduced for clarity of discussion. It should be understood, however, that the accompanying figures illustrate the various implementations described herein and are not meant to limit the scope of various technologies described herein, and.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition skilled persons in the pertinent art have given that term as reflected in printed publications and issued patents at the time of filing. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations.

The term "safety belt" should be understood to include a restraint designed to protect a passenger from injury or death during accidents and collisions.

The term "child safety seat" should be understood to include a seat and its associated apparatus designed to protect children or infants from injury or death during accidents and collisions.

It should be understood that a safety belt can include a lap belt, sash or shoulder belt, multi-point belt, or belt-in-seat (BIS) belt.

Figure 1A:
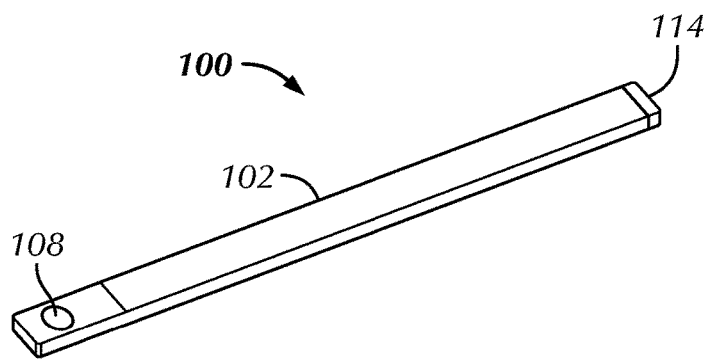
FIG. 1A illustrates an embodiment of the safety belt guide in the retracted position.

FIG. 1A illustrates an embodiment of the safety belt guide 100 in the retracted position. The outer body 102 houses the inner body 104 in this retracted position. The release mechanism 108 allows a user to extend the inner body 104 from the outer body 102. An end cap 114 is attached to the inner body 104 and visible in the retracted position to allow for a user to grasp the inner body 104 and extend the safety guide 100.

The release mechanism 108 may be a button system in which a user presses a button and causes a protrusion located at the rear of the release button to move out of a hole on the outer body 102, thus allowing the inner body 104 to move away from the outer body 102. During extension, the button may be obstructed from the user's view and enclosed within the outer body 102. In certain embodiments, the button may be visible during extension to allow a user to also press the button to retract the inner body back into the outer body.

Figure 1B:
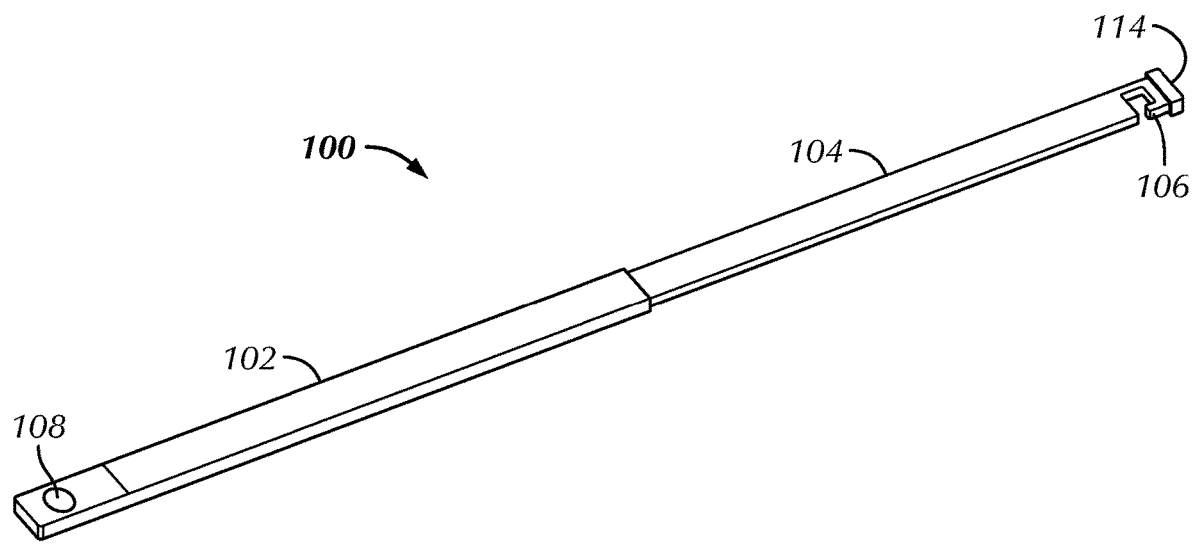
FIG. 1B illustrates an embodiment of the safety belt guide in the extended position.

FIG. 1B illustrates an embodiment of the safety belt guide 100 in the extended position. The inner body 104 is extended away from the outer body 102 by the release mechanism 108 allowing the inner body 104 to slide out of the outer body 102. In certain embodiments, the entire release mechanism 108 may still be visible when the safety belt guide is in the extended position. In certain other embodiments, the release mechanism 108 may have a release button that is attached to the inner body 104 and is housed within the outer body 102 when the safety belt guide 100 is in the extended position.

In certain embodiments, to extend the safety belt guide 100 a user may grasp the end cap 114 to pull the inner body 104 from the outer body 102, thus extending the length of the safety belt guide 100 and exposing the securing mechanism 106. In certain embodiments, the release mechanism 108 may be connected to a spring, allowing the inner body 104 to extend from the outer body 108 without any further action required from the user after activating the release mechanism 108.

Securing mechanism 106 is also shown in FIG. 1B. The securing mechanism 106 is designed to grab a portion of a safety belt and pull the safety belt through a child safety seat.

The securing mechanism 106 may be rigid. In certain other embodiments, the securing mechanism may be flexible, with sufficient rigidity to enclose around a portion of the safety belt. The securing mechanism 106 may be a hook, such as a square bend hook or shoulder hook. In certain other embodiments, the securing mechanism 106 may be a clasp. The securing mechanism 106 may attach to any surface of the safety belt 112, such as the tongue or the webbing, to grasp the safety belt 112 and feed it through a portion of a child safety seat 110.

Figure 2A:
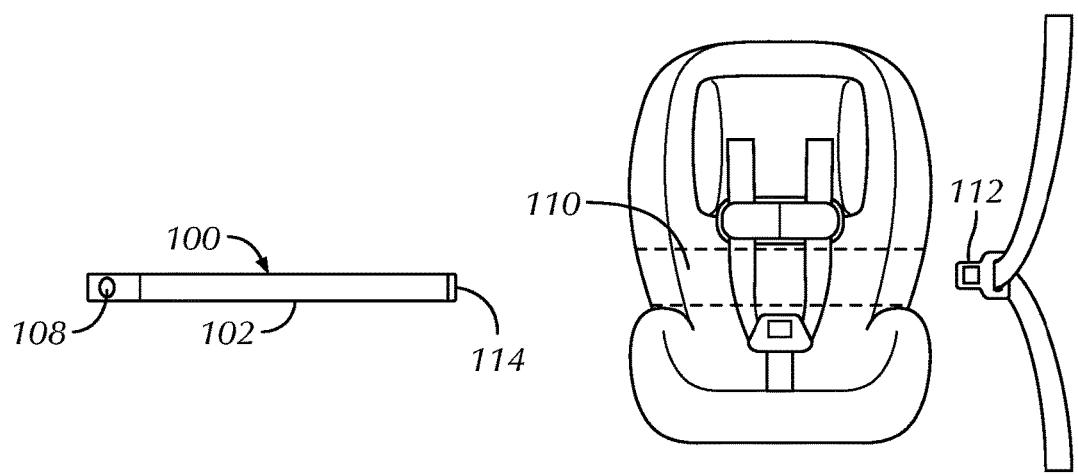
FIG. 2A illustrates an embodiment of the safety belt guide in the retracted position prior to use in relation to a child safety seat and a safety belt.
Figure 2B:
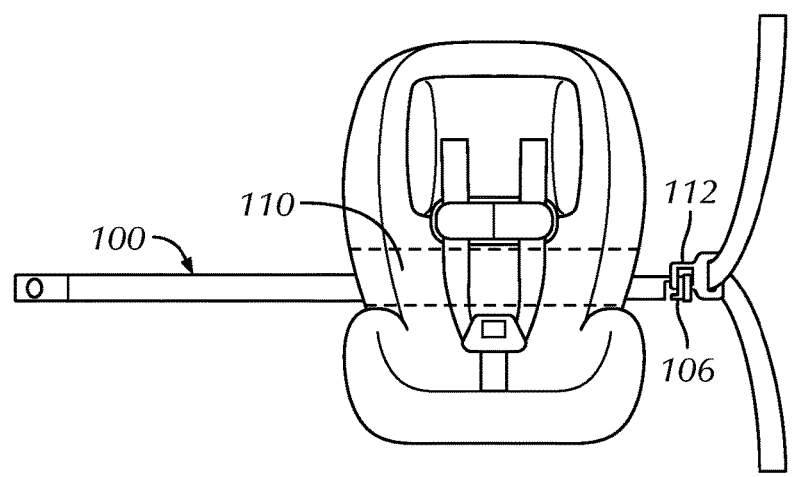
FIG. 2B illustrates an embodiment of the safety belt guide in the extended position, fed through the child safety seat, and engaged with a safety belt.
Figure 2C:
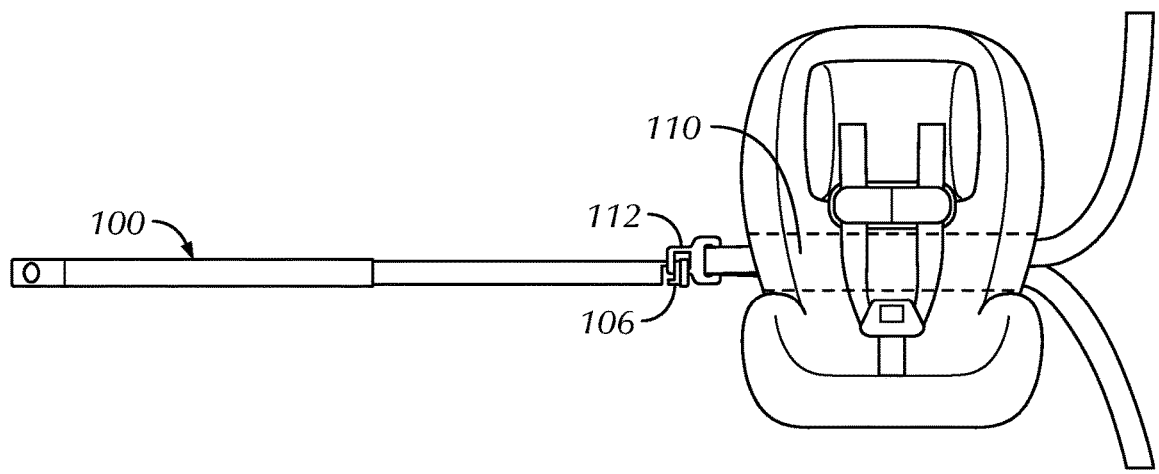
FIG. 2C illustrates an embodiment of the safety belt guide in the extended position and engaged with a safety belt that has been guided through the child safety seat.

FIGS. 2A through 2C demonstrate a use of the safety belt guide in conjunction with a child safety seat. It should be understood that other uses may be contemplated with the safety belt guide 100 without deviating from the spirit of this disclosure. For example, the safety belt guide could be used with a different type of child safety seat where the safety belt connects through a different portion of the child safety seat or through a booster seat.

FIG. 2A illustrates an embodiment of the safety belt guide 100 in the retracted position prior to use in relation to a child safety seat and a safety belt 112. A user may activate the release mechanism 108 to extend the inner body 104 from the outer body 102. This will reveal the securing mechanism 106 on the inner body 104. The safety belt guide 100 may then be fed through a portion of the child safety seat 110 towards the safety belt 112.

FIG. 2B illustrates an embodiment of the safety belt guide 100 in the extended position, fed through a portion of the child safety seat 110, and engaged with a safety belt 112. The securing mechanism 106 attaches to the tongue of the safety belt 112. However, the securing mechanism 106 can also attach any surface of the safety belt, such as along the webbing.

FIG. 2C illustrates an embodiment of the safety belt guide 100 in the extended position and engaged with a safety belt 112 that has been guided through a portion of the child safety seat 110. The tongue of the seatbelt 112 may then be connected to a buckle (not shown) to secure the child safety seat within a vehicle.

To extend the length of the safety belt guide, a user may can activate the release mechanism to allow the safety belt guide to extend fully. A user may also activate the release mechanism to allow the safety belt guide to extend only partially based on the needs of the particular application.

While various devices and methods have been described above in connection with several illustrative embodiments, it is to be understood that other similar embodiments may be used or modified and additions may be made to the described embodiments for performing the same function disclosed herein without deviating therefrom. Further, all embodiments disclosed are not necessarily in the alternative, as various embodiments may be combined or subtracted to provide the desired characteristics. Variations can be made by one having ordinary skill in the art without departing from the spirit and scope hereof. The scope of the present disclosure is determined by the claims that follow.

What is claimed is:

1. A safety belt guide for securing a child safety seat within a vehicle comprising:
   an outer body;
   an inner body housed within the outer body, wherein the inner body and the outer body are slideably engaged; and
   a securing mechanism disposed along an end of the safety belt guide, wherein the securing mechanism is adapted to attach to a safety belt and guide the safety belt through a child safety seat.

2. The safety belt guide of claim 1, wherein the inner body may extend outward from the outer body.

3. The safety belt guide of claim 1, further comprising a release mechanism, the release mechanism capable of releasing the inner body from the outer body when activated.

4. The safety belt guide of claim 1, wherein the securing mechanism is a hook.

5. The safety belt guide of claim 1, wherein the securing mechanism is disposed along the inner body and is capable of being housed within the outer body when the safety belt guide is retracted.

6. A method of securing a child safety seat within a vehicle comprising:
- extending an inner body from an outer body of a safety belt guide by activating a release mechanism on the safety belt guide, wherein the inner body comprises a securing mechanism and an end cap disposed along an end of the safety belt guide;
- threading the extended safety belt guide through a portion of the child safety seat;
- connecting the securing mechanism with a safety belt;
- guiding the safety belt guide and safety belt through the portion of the child safety seat; and,
- securing the safety belt to a buckle.

7. The method of claim 6, wherein the securing mechanism connects to the tongue of the safety belt.

* * * * *